(12) United States Patent
Masaki et al.

(10) Patent No.: US 12,189,382 B2
(45) Date of Patent: Jan. 7, 2025

(54) MONITORING APPARATUS, DISPLAY METHOD, PROGRAM, AND MONITORING SYSTEM FOR DISPLAYING AN OPERATION STATE OF EACH OF A PLURALITY OF EQUIPMENT DEVICES

(71) Applicant: DAIKIN INDUSTRIES, LTD., Osaka (JP)

(72) Inventors: Shinsui Masaki, Osaka (JP); Yasutaka Narikiyo, Osaka (JP); Ryosuke Ono, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/256,994

(22) PCT Filed: Dec. 23, 2021

(86) PCT No.: PCT/JP2021/047834
§ 371 (c)(1),
(2) Date: Jun. 12, 2023

(87) PCT Pub. No.: WO2022/145334
PCT Pub. Date: Jul. 7, 2022

(65) Prior Publication Data
US 2023/0400844 A1     Dec. 14, 2023

(30) Foreign Application Priority Data

Dec. 28, 2020   (JP) .................................. 2020-218534

(51) Int. Cl.
G05B 23/02   (2006.01)
(52) U.S. Cl.
CPC ..... *G05B 23/0272* (2013.01); *G05B 23/0224* (2013.01); *G05B 23/0289* (2013.01)

(58) Field of Classification Search
CPC ............ G05B 23/0272; G05B 23/0224; G05B 23/0289
See application file for complete search history.

(56) References Cited

U.S. PATENT DOCUMENTS

| 7,241,218 | B2 * | 7/2007 | Van Becelaere ..... F24F 11/0001 454/369 |
| 2007/0008099 | A1 * | 1/2007 | Kimmel .................. G08B 25/14 340/506 |

(Continued)

FOREIGN PATENT DOCUMENTS

| CN | 101770826 | 7/2010 |
| JP | 2010-007947 | 1/2010 |

(Continued)

OTHER PUBLICATIONS

International Search Report for PCT/JP2021/047834 mailed on Mar. 22, 2022.

(Continued)

*Primary Examiner* — Darrin D Dunn
*Assistant Examiner* — Marzia T Monty
(74) *Attorney, Agent, or Firm* — IPUSA, PLLC

(57) ABSTRACT

A monitoring apparatus of a plurality of equipment devices displays, on a state display screen, an operation state of each of the plurality of equipment devices in summary, and includes a display control unit configured to display, on the state display screen, information indicating each of the plurality of equipment devices and information relating to control that changed the operation state of the equipment device, in association with each other.

15 Claims, 17 Drawing Sheets

(56)  References Cited

U.S. PATENT DOCUMENTS

| | | | |
|---|---|---|---|
| 2011/0119592 A1* | 5/2011 | Tada ................ | H04N 21/25825 |
| | | | 715/736 |
| 2012/0083906 A1* | 4/2012 | Weatherhead ..... | G05B 23/0267 |
| | | | 700/83 |
| 2016/0328954 A1* | 11/2016 | Ramadoss .......... | G05B 19/0428 |
| 2016/0359325 A1* | 12/2016 | Kawata ............... | H04L 12/2829 |
| 2018/0335770 A1 | 11/2018 | Uemura | |
| 2022/0121352 A1* | 4/2022 | Vora .................... | H04L 12/1822 |
| 2022/0136727 A1* | 5/2022 | Kanamaru ............... | F24F 11/64 |
| | | | 700/276 |
| 2022/0154963 A1* | 5/2022 | Weng ........................ | F24F 11/30 |
| 2022/0171891 A1* | 6/2022 | Sinha ............... | G05B 19/41885 |

FOREIGN PATENT DOCUMENTS

| | | |
|---|---|---|
| JP | 2010-146104 | 7/2010 |
| JP | 5653227 | 1/2015 |

OTHER PUBLICATIONS

International Preliminary Report on Patentability for PCT/JP2021/047834 mailed on Jul. 13, 2023.
Partial Search Report mailed on Jun. 3, 2024 with respect to the corresponding European patent application No. 21915194.1.

* cited by examiner

FIG.4

| PRIORITY LEVEL | VALUE |
|---|---|
| 1 | null |
| 2 | null |
| 3 | null |
| 4 | null |
| 5 | null |
| 6 | OPERATION |
| 7 | null |
| 8 | null |
| 9 | STOP |
| 10 | null |
| 11 | null |
| 12 | null |
| 13 | null |
| 14 | null |
| 15 | null |
| 16 | null |

FIG.5

| TIME | CONTROL FUNCTION | PRIORITY LEVEL | VALUE |
|---|---|---|---|
| 9:00 | LINKED CONTROL (KEY OPERATION) | 6 | OPERATION |
| 14:00 | FIRE DISASTER CONTROL | 1 | STOP |
| 14:30 | FIRE DISASTER CONTROL | 1 | null |
| 16:00 | USER CONTROL (ADMINISTRATOR) | 9 | STOP |

FIG.6

| PRIORITY LEVEL | VALUE | CONTROL FUNCTION | CONTROL FUNCTION DETAILS | TIME |
|---|---|---|---|---|
| 1 | null | FIRE DISASTER CONTROL | – | 14:30 |
| ⋮ | ⋮ | ⋮ | ⋮ | ⋮ |
| 6 | OPERATION | LINKED CONTROL | KEY LINKING | 9:00 |
| ⋮ | ⋮ | ⋮ | ⋮ | ⋮ |
| 9 | STOP | USER CONTROL | ADMINISTRATOR | 16:00 |
| ⋮ | ⋮ | ⋮ | ⋮ | ⋮ |
| 16 | null | ⋮ | ⋮ | ⋮ |

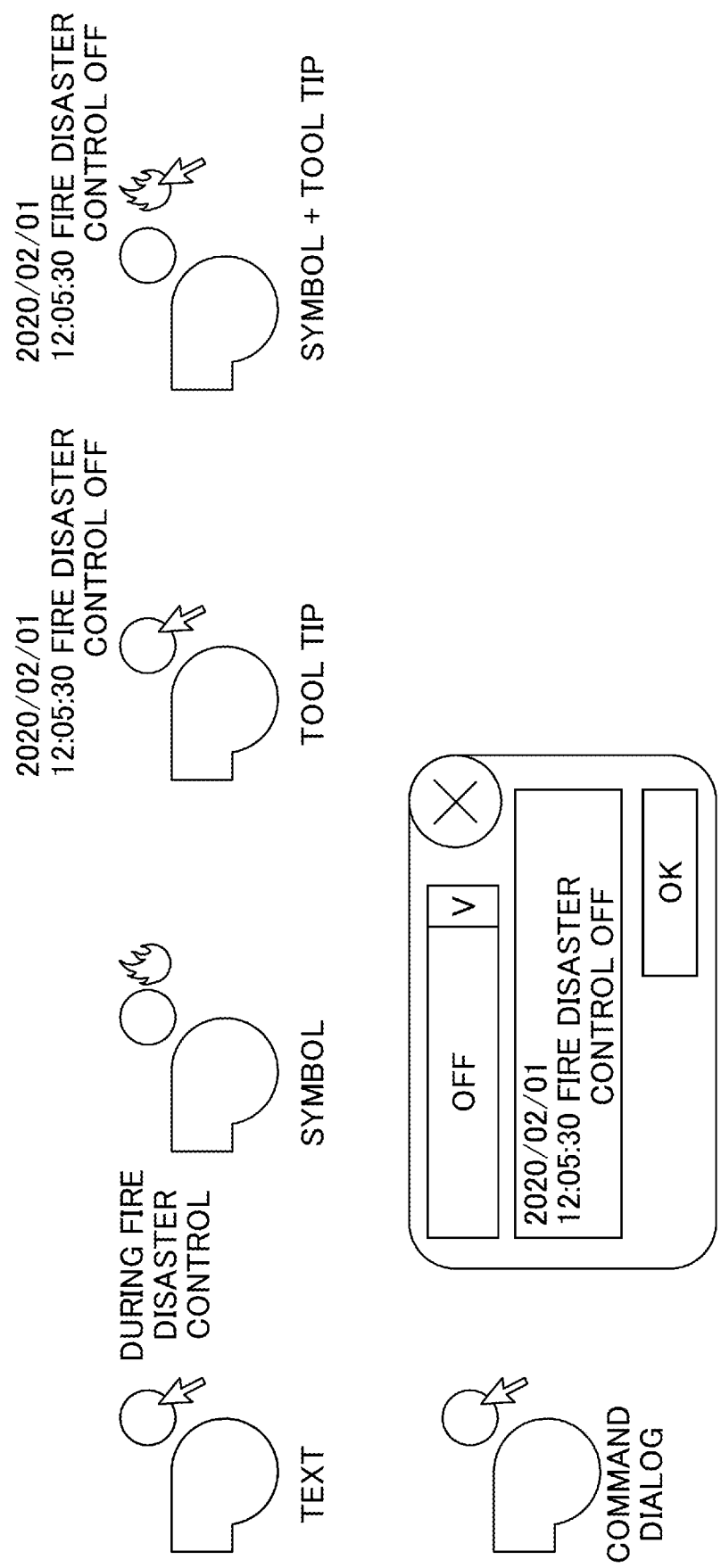

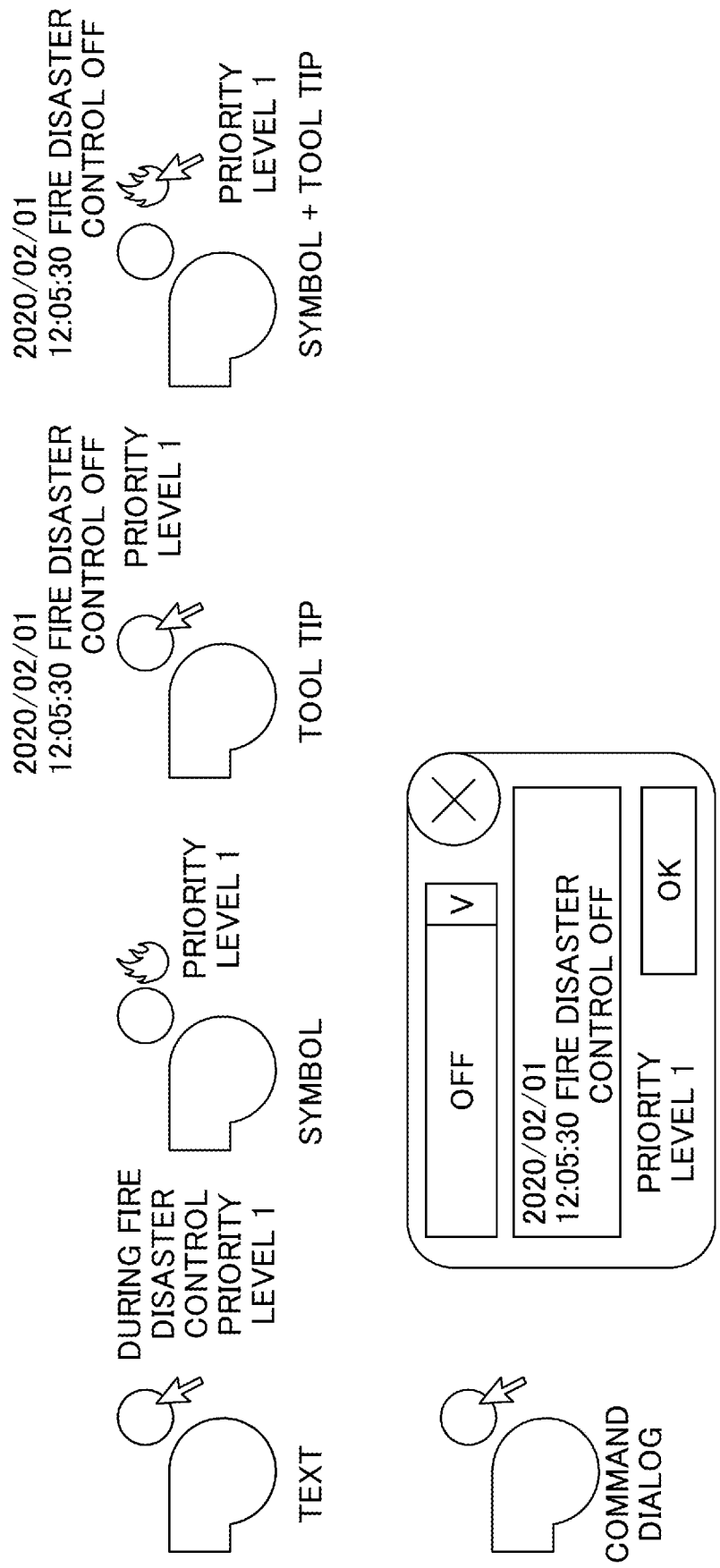

FIG.10A
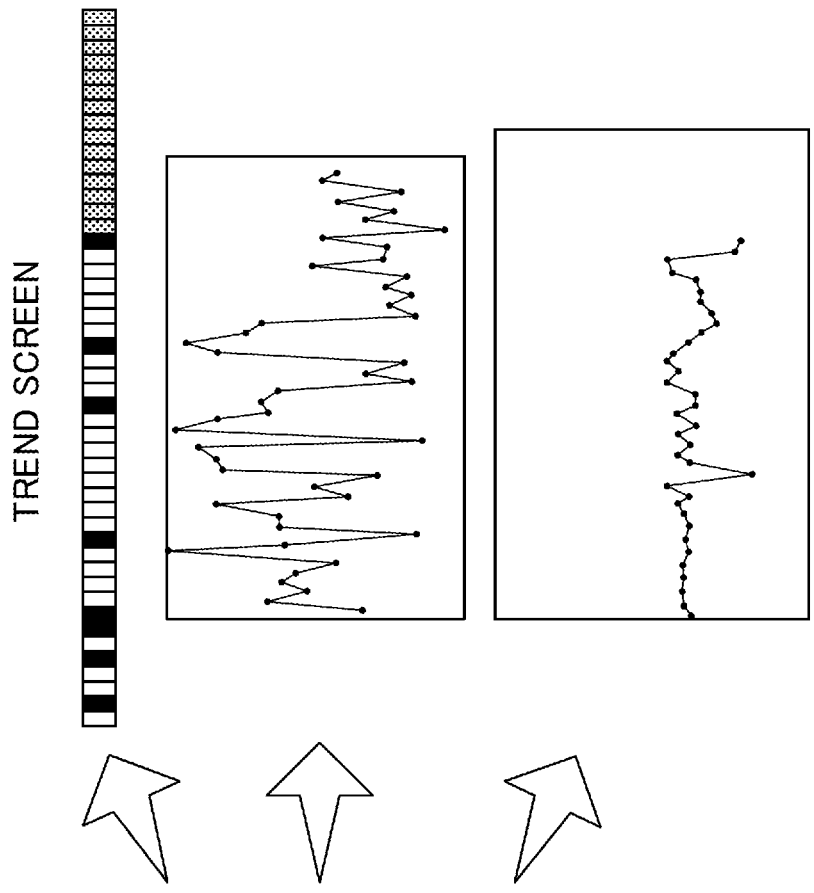
TREND SCREEN
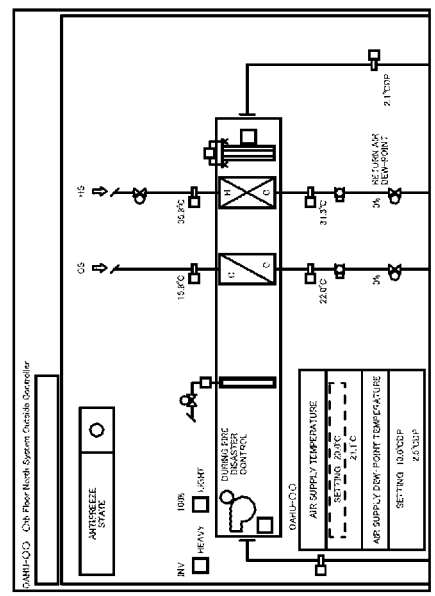
SUMMARY SCREEN

FIG.10B

| TIME | VALUE | NAME |
|---|---|---|
| 2020/02/01 17:00:05 | OFF | AIR CONDITIONER STATE |
| 2020/02/01 08:00:03 | ON | AIR CONDITIONER STATE |
| 2020/01/31 17:00:04 | OFF | AIR CONDITIONER STATE |
| 2020/01/31 08:00:05 | ON | AIR CONDITIONER STATE |
| 2020/01/30 17:00:05 | OFF | AIR CONDITIONER STATE |
| XXXX/XX/XX XX:XX:XX | XX | XXXXXXX |

| TIME | VALUE | NAME |
|---|---|---|
| 2020/02/01 17:00:00 | 22.3°C | OFFICE ROOM INDOOR TEMPERATURE |
| 2020/02/01 16:00:00 | 22.1°C | OFFICE ROOM INDOOR TEMPERATURE |
| 2020/02/01 15:00:00 | 22.5°C | OFFICE ROOM INDOOR TEMPERATURE |
| 2020/02/01 14:00:00 | 22.2°C | OFFICE ROOM INDOOR TEMPERATURE |
| 2020/02/01 13:00:00 | 22.1°C | OFFICE ROOM INDOOR TEMPERATURE |
| XXXX/XX/XX XX:XX:XX | XX | XXXXXXX |

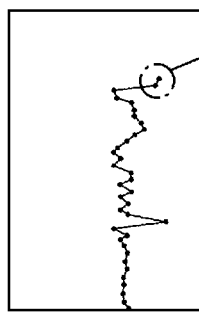

FIG.11

1F AIR CONDITIONER LIGHTING

| 1F AIR CONDITIONER LIGHTING | 2F AIR CONDITIONER LIGHTING |
|---|---|

| | | | |
|---|---|---|---|
| ON | 2020/02/01 07:30:15 USER CONTROL | OFF | 2020/02/01 07:35:01 USER CONTROL |
| LIGHTING 1 | | LIGHTING 2 | |
| ON | 2020/02/01 07:28:05 LINKED CONTROL | OFF | 2020/02/01 12:05:30 FIRE DISASTER CONTROL |
| AIR CONDITIONER 1 | | AIR CONDITIONER 2 | |

| 25.5°C | 1234 kWh |
|---|---|
| INDOOR TEMPERATURE | POWER |

FIG.12

| DISPLAY CONTROL | USER | | |
|---|---|---|---|
| | ADMINISTRATOR | FIELD SERVICE | AIR CONDITIONER USER |
| CONSTANT DISPLAY | SAMPLE 1 | SAMPLE 2 | |
| DISPLAY WHEN USER OPERATES | SAMPLE 1 | | |
| DISPLAY WHEN PERFORMING CONTROL THAT IS DIFFERENT FROM USER'S INTENTION (OPERATION, SCHEDULE SETTING) | | | SAMPLE 3 |

MONITORING APPARATUS, DISPLAY METHOD, PROGRAM, AND MONITORING SYSTEM FOR DISPLAYING AN OPERATION STATE OF EACH OF A PLURALITY OF EQUIPMENT DEVICES

TECHNICAL FIELD

The present disclosure relates to a monitoring apparatus, a display method, a program, and a monitoring system.

BACKGROUND ART

An operator in charge of maintenance and management of an equipment device in a construction, such as a factory and a building facility, monitors the operation state and the like by looking at current value data and trend graphs of the target device displayed on a central monitoring apparatus.

For example, even when a target device is controlled by multiple control methods by displaying a control state trend that displays the operation state of the target device together with the control state of each of the multiple control methods, there is known a monitoring apparatus that can identify at a glance the operation state of the target device and the transition of the control state, that is, which control method has caused the target device to start/stop (see, for example, Patent Document 1).

CITATION LIST

Patent Documents

Patent Document 1

(Patent document 1) Publication of Japanese Patent No. 5653227

SUMMARY OF INVENTION

Technical Problem

For example, in a monitoring apparatus of a plurality of equipment device that displays, on a state display screen, an operation state of each of the plurality of equipment devices in summary, there is a problem in that a user viewing the state display screen is unable to determine, from the information displayed on the state display screen, the control that has caused the operation state of the equipment device to change. Patent Document 1 does not mention such a problem.

The purpose of the present disclosure is to provide a monitoring apparatus, a display method, a program, and a monitoring system by which a user can identify on a state display screen the control that is a factor in changing the operation state of equipment device.

Solution to Problem

The monitoring apparatus of the present disclosure is a monitoring apparatus of a plurality of equipment devices that displays, on a state display screen, an operation state of each of the plurality of equipment devices in summary, the monitoring apparatus including:
a display control unit configured to display, on the state display screen, information indicating each of the plurality of equipment devices and information relating to control that changed the operation state of the equipment device, in association with each other.

According to the present disclosure, by displaying the information indicating the plurality of equipment devices and the information relating to the control that changed the operation state of the equipment device in association with each other on the state display screen, the user can identify the control that caused the operation state of the equipment device to change on the state display screen.

The information relating to the control that changed the operation state of the equipment device may include a control function that changed the operation state of the equipment device and information indicating a command content.

According to the present disclosure, the information indicating the control function and the command content that changed the operation state of the equipment device can be identified by the user on the state display screen.

The information relating to the control that changed the operation state of the equipment device may further include information indicating a time when the control function changed the operation state of the equipment device.

According to the present disclosure, the information indicating the time when the control function changed the operation state of the equipment device can be identified by the user on the information display screen.

A control history information managing unit configured to manage, as control history information of each of the plurality of equipment devices, the control function that reported a control command for changing the operation state of the equipment device, the command content included in the control command, and information indicating a priority level of the control function, may be further included, and
the display control unit may display, on the state display screen by using the control history information, the control function that most recently changed the operation state of the equipment device and information indicating the command content, in association with the information indicating each of the plurality of equipment devices.

According to the present disclosure, the user can identify the information indicating the control function and the command content that most recently changed the operation state of the equipment device on the state display screen for each equipment device.

The control function may include a control function for changing the operation state of the equipment device by a user operation, and
the information relating to the control that changed the operation state of the equipment device may further include information indicating a user that has executed the user operation.

According to the present disclosure, information indicating the user who changed the operation state of the equipment device by the control function can be displayed on the state display screen to allow the user to identify the information.

The control function may include a control function for changing the operation state of the equipment device by linking with another function, and
the information relating to the control that changed the operation state of the equipment device may further include information indicating a condition under which the linking with the another function was activated.

According to the present disclosure, information indicating the condition under which the linking with the other function was activated can be displayed on the state display screen to allow the user to identify the condition.

The display method of the present disclosure is a display method performed in a monitoring apparatus of a plurality of equipment devices that displays, on a state display screen, an operation state of each of the plurality of equipment devices in summary, the display method including:
- a step of receiving, from a first control function, a control command for changing the operation state of the equipment device; and
- a step of displaying, on the state display screen, information relating to control by a second control function, in response to detecting that a priority level of the second control function that changed the operation state of the equipment device is higher than a priority level of the first control function.

According to the present disclosure, when the priority level of the second control function, which is the factor that changed the operation state of the equipment device, is higher than the priority level of the first control function that received the control command, by displaying information relating to the control of the second control function on the state display screen, the user can identify the control that is the factor that changed the operation state of the equipment device on the state display screen.

The display method of the present disclosure is a display method performed in a monitoring apparatus of a plurality of equipment devices that displays, on a state display screen, an operation state of each of the plurality of equipment devices in summary, the display method including:
- a step of acquiring, for each of the equipment devices, information relating to control that changed the operation state of each of the plurality of equipment devices; and
- a step of displaying, on the state display screen, information indicating each of the plurality of equipment devices and the information relating to the control that changed the operation state of the equipment device, in association with each other.

According to the present disclosure, by displaying information indicating the plurality of equipment devices and the information relating to control that changed the operation state of the equipment devices in association with each other on the state display screen, the user can identify the control that caused the operation state of the equipment device to change on the state display screen.

The display method of the present disclosure is a display method performed in a monitoring apparatus of a plurality of equipment devices that displays, on a state display screen, an operation state of each of the plurality of equipment devices in summary, the display method including:
- a step of receiving a user operation with respect to a first control function for changing the operation state of the equipment device; and
- a step of displaying, on the state display screen, information relating to control by a second control function to be overwritten by information relating to control by the first control function, in response to detecting that a priority level of the second control function that changed the operation state of the equipment device is lower than a priority level of the first control function.

According to the present disclosure, the user can identify on the state display screen that the information relating to the control of the second control function will be overwritten by the information relating to the control of the first control function when the priority level of the second control function, which is the factor that changed the operation state of the equipment device, is lower than the priority level of the first control function that received the user's operation.

The program of the present disclosure causes a monitoring apparatus of a plurality of equipment devices that displays, on a state display screen, an operation state of each of the plurality of equipment devices in summary, to execute:
- a step of receiving, from a first control function, a control command for changing the operation state of the equipment device; and
- a step of displaying, on the state display screen, information relating to control by a second control function, in response to detecting that a priority level of the second control function that changed the operation state of the equipment device is higher than a priority level of the first control function.

According to the present disclosure, when the priority level of the second control function, which is the factor that changed the operation state of the equipment device, is higher than the priority level of the first control function that received the control command, by displaying information relating to the control of the second control function on the state display screen, the user can identify the control that is the factor that changed the operation state of the equipment device on the state display screen.

The program of the present disclosure causes a monitoring apparatus of a plurality of equipment devices that displays, on a state display screen, an operation state of each of the plurality of equipment devices in summary, to execute:
- a step of acquiring, for each of the equipment devices, information relating to control that changed the operation state of each of the plurality of equipment devices; and
- a step of displaying, on the state display screen, information indicating each of the plurality of equipment devices and the information relating to the control that changed the operation state of the equipment device, in association with each other.

According to the present disclosure, by displaying information indicating the plurality of equipment devices and the information relating to control that changed the operation state of the equipment device in association with each other on the state display screen, the user can identify the control that caused the operation state of the equipment device to change on the state display screen.

The program of the present disclosure causes a monitoring apparatus of a plurality of equipment devices that displays, on a state display screen, an operation state of each of the plurality of equipment devices in summary, to execute:
- a step of receiving a user operation with respect to a first control function for changing the operation state of the equipment device; and
- a step of displaying, on the state display screen, information relating to control by a second control function to be overwritten by information relating to control by the first control function, in response to detecting that a priority level of the second control function that changed the operation state of the equipment device is lower than a priority level of the first control function.

According to the present disclosure, the user can identify on the state display screen that the information relating to the control of the second control function will be overwritten by the information relating to the control of the first control function when the priority level of the second control function, which is the factor that changed the operation state of the equipment device, is lower than the priority level of the first control function that received the user's operation.

The monitoring system of the present disclosure is a monitoring system of a plurality of equipment devices that displays, on a state display screen, an operation state of each of the plurality of equipment devices in summary, the monitoring system including:

a control unit configured to control an operation of one or more of the equipment devices according to a control command from a plurality of control functions associated with priority levels;

an acquiring unit configured to acquire, from the control unit, information relating to control that changed the operation state of the equipment device; and a display control unit configured to display, on the state display screen, information indicating each of the plurality of equipment devices and the information relating to the control that changed the operation state of the equipment device, in association with each other.

According to the present disclosure, by displaying on the state display screen the information indicating the plurality of equipment devices and the information relating to the control that changed the operation state of the equipment device in association with each other, the user can identify the control that caused the operation state of the equipment device and equipment device to change on the state display screen.

BRIEF DESCRIPTION OF DRAWINGS

FIG. 4 is a configuration diagram of an example of a control function priority management table.

FIG. 5 is a configuration diagram of an example of a control command history table.

FIG. 6 is a configuration diagram of an example of a control history information table.

FIG. 9A illustrates an example of a display of information relating to control that changed the operation state of equipment device.

FIG. 9B illustrates an example of a display of information relating to control that changed the operation state of equipment device.

FIG. 10A is an illustration of an example of a trend screen.

FIG. 10B is an illustration of an example of a trend screen.

FIG. 11 is an illustration of an example of a summary screen.

FIG. 12 is a diagram for explaining variations of display control according to the present embodiment.

DESCRIPTION OF EMBODIMENTS

Next, the embodiment of the present invention will be described in detail.

First Embodiment

<System Configuration>

Figure 1:
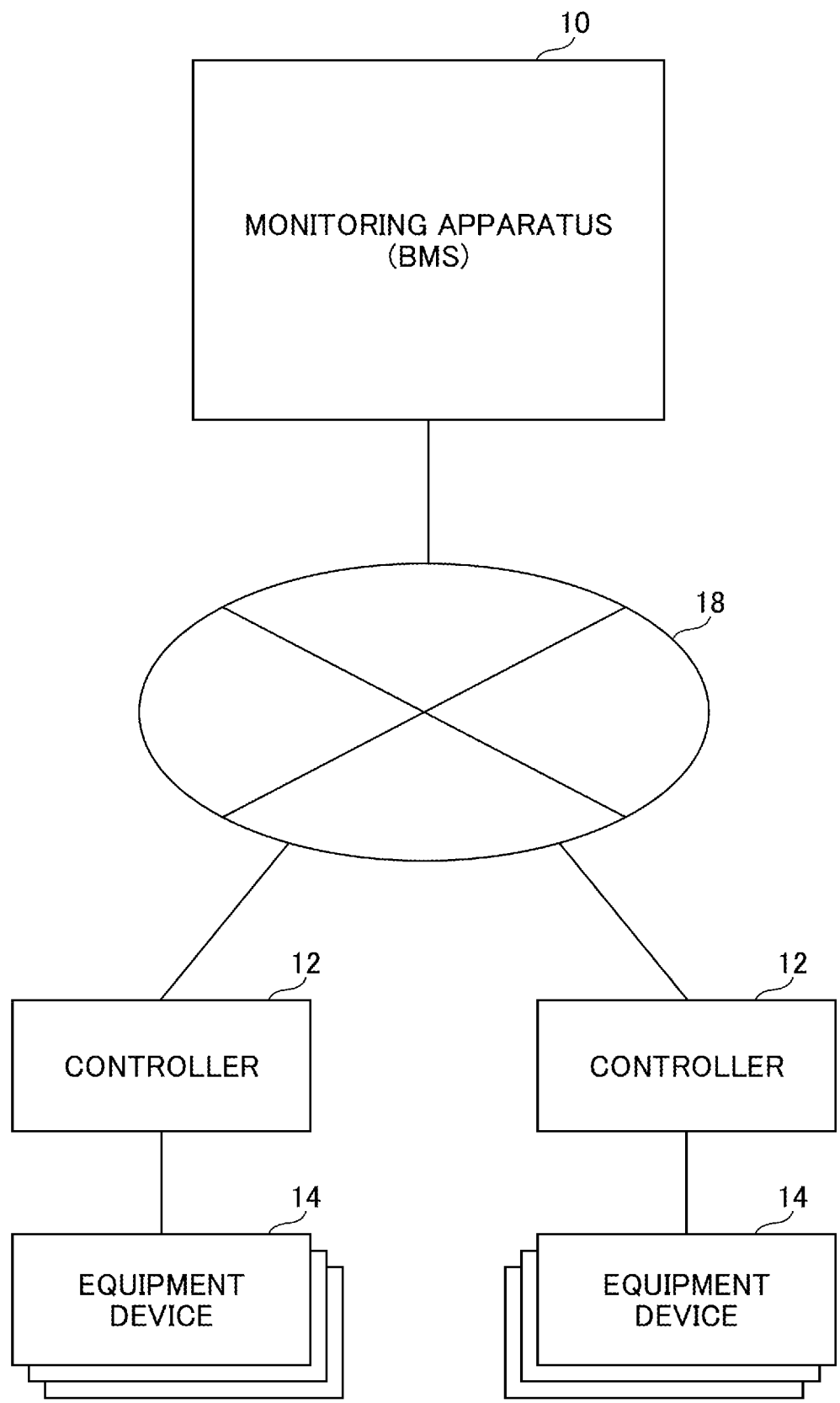
FIG. 1 is a configuration diagram of an example of a monitoring system according to the present embodiment.

FIG. 1 is a configuration diagram of an example of a monitoring system according to the present embodiment. The monitoring system includes a monitoring apparatus 10, a controller 12, and an equipment device 14. The monitoring apparatus 10 and one or more controllers 12 can communicate via a network 18, such as a local area network (LAN). The monitoring apparatus 10 may be implemented by a service using the Internet or cloud computing, for example. The network 18 may use a wireless communication system such as 3G, 4G, or 5G. The name of the monitoring apparatus 10 is an example and may be another name.

The controller 12 and the equipment device 14 are installed in a construction such as a building, for example. The controller 12 can communicate with one or more equipment devices 14 that are monitoring targets. The controller 12 has multiple control functions with different priority levels and receives control commands from multiple control functions. Further, the controller 12 receives control commands from multiple control functions with different priority levels from the monitoring apparatus 10 or another controller 12, etc. The controller 12 controls the equipment device 14 by transmitting, to the equipment device 14 according to the priority level, a control command from a control function selected from control commands of the multiple control functions, as described later.

Further, the controller 12 acquires state information (such as temperature) from the equipment device 14 and transmits the state information to the monitoring apparatus 10. The controller 12 manages the control command history described later. The controller 12 transmits the control history information described later to the monitoring apparatus 10.

The equipment device 14 is an air conditioner installed in a construction such as a building. For example, if the equipment device 14 is an air conditioner, the command content included in the control command includes a start/stop command, such as to start operating or stop operating, or a setting command, such as to set the temperature. The operation state of the equipment device 14 is controlled according to the command content from the controller 12.

The monitoring apparatus 10 is an example of an information processing apparatus that monitors the equipment device 14. For example, the monitoring apparatus 10 is implemented by BMS (Building Management System). The monitoring apparatus 10 includes a function of central monitoring such as alarm monitoring, monitoring the state of the equipment device 14, automatic control, operation management, or the like.

The monitoring apparatus 10 performs display control for controlling the display of screens such as a summary screen or a trend screen used by the user for monitoring the equipment device 14. The summary screen is an example of a state display screen and is used by the user to confirm the operation state of one or more equipment devices 14. The monitoring apparatus 10 uses, for example, control history information and state information of the equipment device 14 received from the controller 12 to create a summary screen or a trend screen. Further, the monitoring apparatus 10 uses display information such as symbols to create a summary screen. Details of the summary screen will be described later. The trend screen is used, for example, to graphically display changes over time such as changes of the operation state of equipment device 14, the temperature, the humidity, or the like.

The monitoring apparatus 10 also has a control function for sending control commands to the controller 12. The monitoring apparatus 10 manages control history information and state information of the equipment device 14 received from the controller 12.

The monitoring apparatus 10 is an information processing apparatus that can be operated by a user such as a user of a PC. The monitoring apparatus 10 may display a summary screen or a trend screen on an information processing apparatus that can be operated by a user such as a user of a mobile phone, a smartphone, a tablet terminal, a PC, or the like.

The monitoring system in FIG. 1 is an example, and the monitoring apparatus 10 may be configured with an information processing system implemented by one or more computers, for example. Further, the monitoring system in FIG. 1 is an example, and it is obvious that there are various system configuration examples depending on the application and purpose.

<Hardware Configuration>

Figure 2:
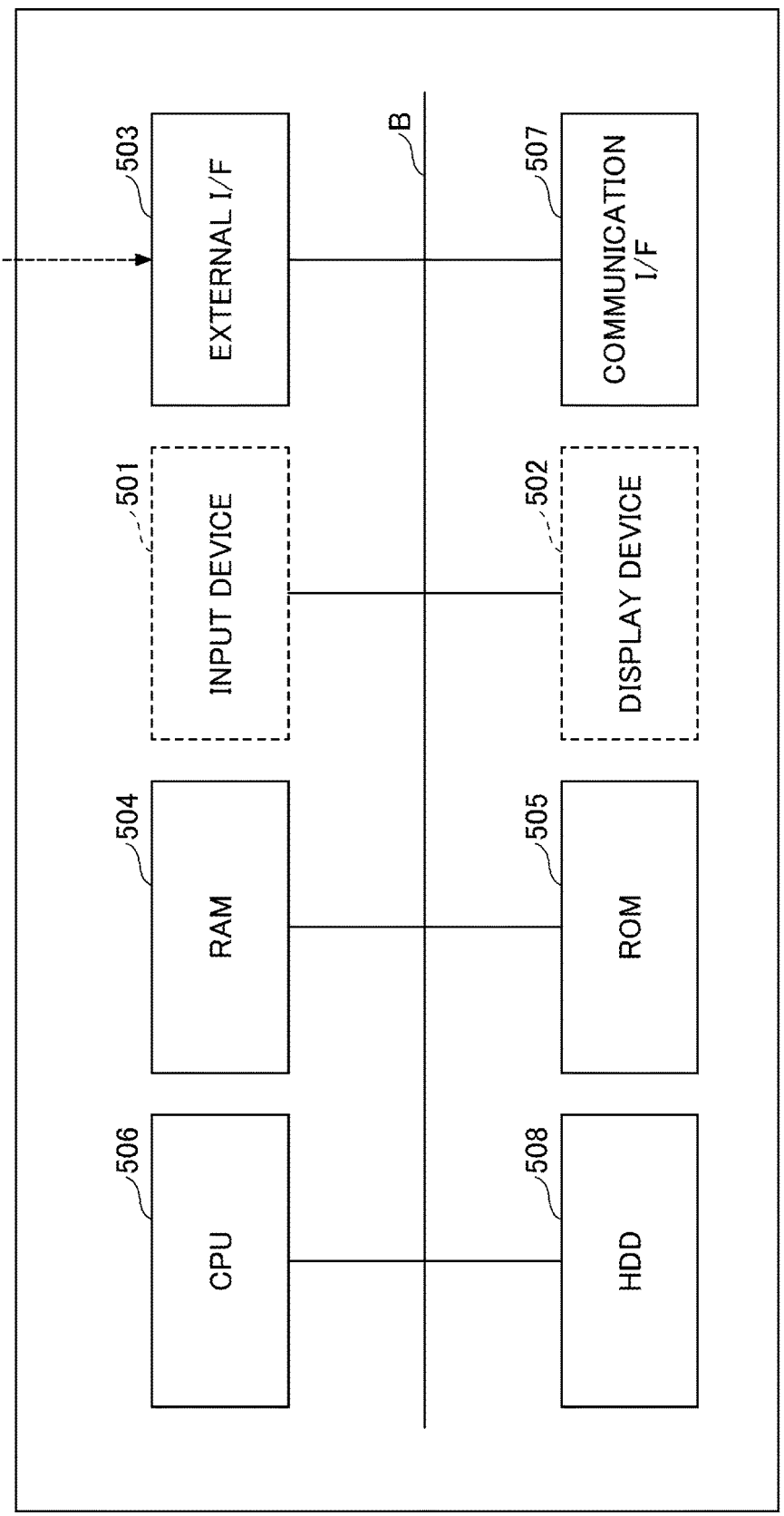
FIG. 2 is a hardware configuration diagram of an example of a computer according to the present embodiment.

The monitoring apparatus 10 and the controller 12 in FIG. 1 are implemented by, for example, a computer 500 with the hardware configuration illustrated in FIG. 2. The hardware configuration of the equipment device 14 is omitted.

FIG. 2 is a hardware configuration diagram of an example of a computer according to the present embodiment. The computer 500 in FIG. 2 is equipped with an input device 501, a display device 502, an external I/F 503, a RAM 504, a ROM 505, a CPU 506, a communication I/F 507, an HDD 508, etc., and these elements are connected to each other by a bus B. The input device 501 and the display device 502 may be connected and used when necessary.

The input device 501 is a touch panel, operation keys and buttons, a keyboard, and a mouse, etc., used by the user to input various signals. The display device 502 is configured by a display such as a liquid crystal display or an organic EL display that displays a screen, and a speaker that outputs sound data such as voice and music. The communication I/F 507 is an interface that connects the computer 500 to the network 18 or the like. The computer 500 can perform data communication via a communication I/F 507.

The HDD 508 is an example of a nonvolatile storage device that stores programs and data. The stored programs and data include an OS, which is basic software that controls the entire computer 500, and applications that provide various functions on the OS.

The computer 500 may use a drive device (e.g., solid-state drive: SSD) that uses a flash memory as a storage medium instead of the HDD 508.

The external I/F 503 is an interface with an external device. The external device includes a recording medium 503a. The computer 500 can read and/or write information in the recording medium 503a via the external I/F 503. The recording medium 503a may be a flexible disk, a CD, a DVD, an SD memory card, a USB memory, etc.

The ROM 505 is an example of a nonvolatile semiconductor memory (storage device) that can hold programs and data even when the power is turned off. The ROM 505 stores programs such as BIOS that is executed when the computer 500 starts, OS settings, and network settings, and data. The RAM 504 is an example of a volatile semiconductor memory (storage device) that temporarily holds programs and data.

The CPU 506 is an arithmetic unit that implements control and functions of the entire computer 500 by reading programs and data from storage devices such as the ROM 505 and the HDD 508 onto the RAM 504 and executing processing.

The monitoring apparatus 10 and the controller 12 according to the present embodiment can implement various types of processing as described later by executing programs by using resources capable of information processing as described above.

<Software Configuration>

<<Functional Blocks>>

Figure 3:
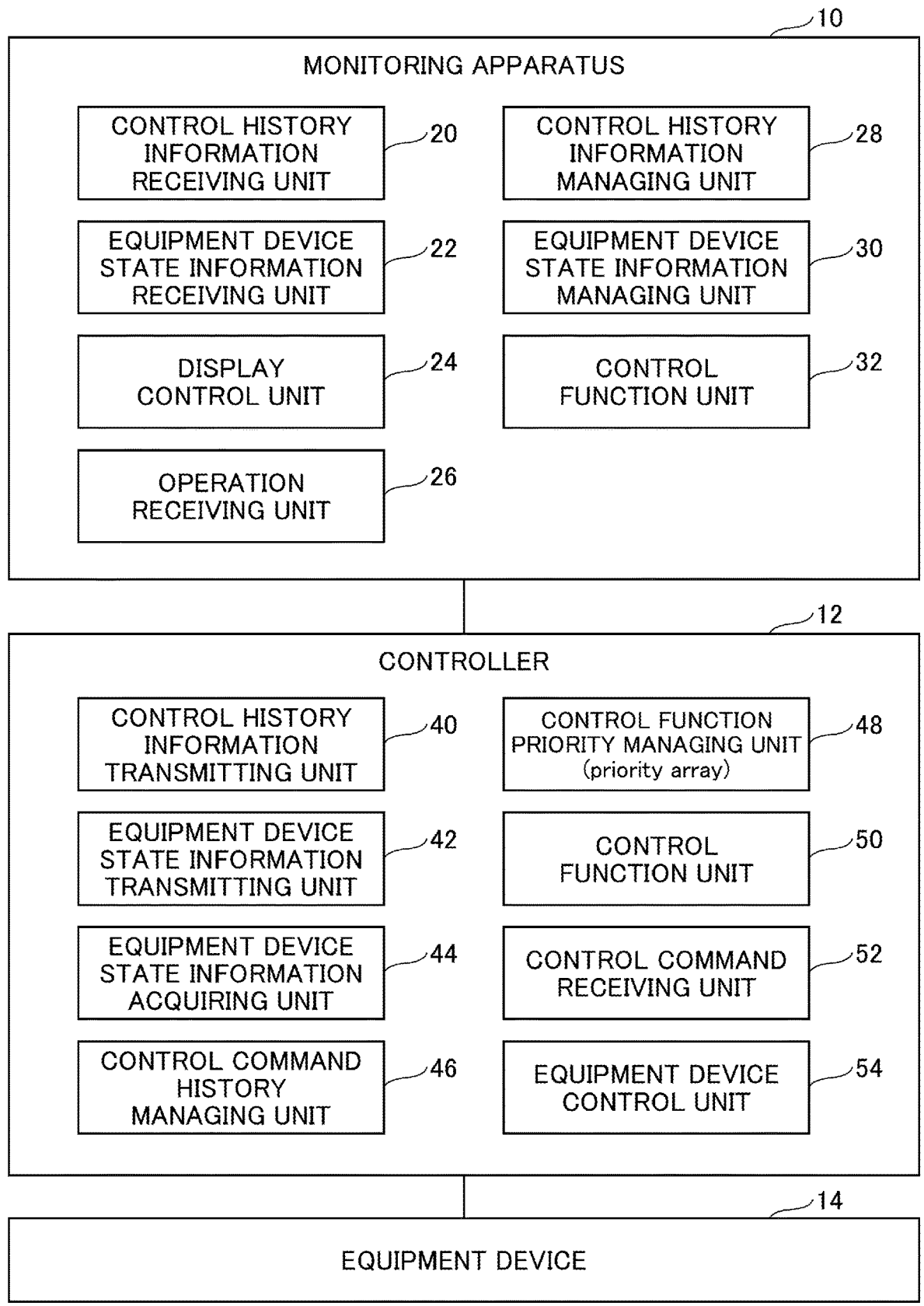
FIG. 3 is a functional block diagram of an example of a monitoring apparatus and a controller of a monitoring system according to the present embodiment.

The functional blocks of the monitoring apparatus 10 and the controller 12 of the monitoring system according to the present embodiment will be described. FIG. 3 is a function block diagram of an example of the monitoring apparatus and the controller of the monitoring system according to the present embodiment.

By executing a program, the monitoring apparatus 10 implements a control history information receiving unit 20, an equipment device state information receiving unit 22, a display control unit 24, an operation receiving unit 26, a control history information managing unit 28, an equipment device state information managing unit 30, and a control function unit 32. Further, by executing a program, the controller 12 implements a control history information transmitting unit 40, an equipment device state information transmitting unit 42, an equipment device state information acquiring unit 44, a control command history managing unit 46, a control function priority managing unit 48, a control function unit 50, a control command receiving unit 52, and an equipment device control unit 54.

In the functional block diagram of FIG. 3, functions unnecessary for the description of the monitoring system according to the present embodiment are omitted as appropriate.

The control function priority managing unit 48 of the controller 12 manages control commands to the equipment device 14 received from the multiple control functions, according to a control function priority management table (priority array) as illustrated in, for example, FIG. 4 corresponding to the equipment device 14 that is the monitoring target. FIG. 4 is a configuration diagram of an example of a control function priority management table. Different priority levels are set for multiple control functions.

The control function priority management table illustrated in FIG. 4 stores, as the value of each priority level from "1" to "16", null indicating that no control command is received or the command content (command) of the received control command. For example, in the control function priority management table illustrated in FIG. 4, "operation" is stored as the value of the priority level "6" and "stop" is stored as the value of the priority level "9". The lower the number of the priority level, the higher the priority. It may also be possible to set priority levels for prioritizing later inputs, in which the priority levels are set to have the same priorities. For priority levels (e.g., "6" to "8") of the same priority, the values of priority levels "6" and "8" are set to release "null", which are the priority levels other than priority level "7" for which the control command has been received.

The control function unit 50 is an example of a control function provided in the controller 12 and transmits a control command specifying the priority level set to itself. The control command receiving unit 52 receives a control command from the control function unit 50, a control command from another controller 12, or a control command from the control function unit 32 of the monitoring apparatus 10. Based on the control command received by the control command receiving unit 52, the control function priority managing unit 48 updates the value of the control function priority management table illustrated in FIG. 4. Details of the processing for updating the value of the control function priority management table illustrated in FIG. 4 will be described later.

Based on the control function priority management table managed by the control function priority managing unit 48, the equipment device control unit 54 controls the equipment device 14 that is the monitoring target according to the control command having the highest priority level and a value that is not null (a non-null value). For example, in the example of FIG. 4, the equipment device 14 that is the monitoring target is controlled according to the control command of the highest priority level "6" for which a non-null value.

The equipment device state information acquiring unit 44 acquires state information from the equipment device 14. The control command history managing unit 46 manages the received control command history by, for example, the control command history table illustrated in FIG. 5. FIG. 5 illustrates an example of the configuration of the control command history table. The control command history table in FIG. 5 stores the time when the control command was received, the control function that reported the control command, and the priority level and the value of the control function that reported the control command.

The control history information transmission unit 40 transmits, to the monitoring apparatus 10 as control history information, for example, the information of the control function priority management table in FIG. 4 and the information of the control command history table in FIG. 5, which are necessary to create the control history information table as illustrated in FIG. 6. FIG. 6 is a configuration diagram of an example of the control history information table.

The control history information table in FIG. 6 stores the value of each priority level from "1" to "16", the control function that reported the control command, the control command details, and the time when the control command was received. By using the control history information table in FIG. 6, the monitoring apparatus 10 can confirm the operation state of the equipment device 14 that is the monitoring target, the control function that changed the operation state to the corresponding operation state, and the time when the operation state changed to the corresponding operation state, as described later. Further, the equipment device state information transmitting unit 42 transmits the state information of the equipment device 14 to the monitoring apparatus 10.

The control history information receiving unit 20 of the monitoring apparatus 10 receives control history information described later from the controller 12. The equipment device state information receiving unit 22 receives state information of the equipment device 14 from the controller 12. The control history information managing unit 28 manages control history information by, for example, the control history information table illustrated in FIG. 6.

The control history information illustrated in FIG. 6 defines at least the same number of priority levels as the control function priority management table managed by the control function priority managing unit 48 of the controller 12. In the control history information illustrated in FIG. 6, the value of each priority level is updated by a value of the control function priority management table managed by the control function priority managing unit 48 of the controller 12. In the control history information illustrated in FIG. 6, the control function that reported the control command and the time of the control command are updated by the information of the control command history table managed by the control command history managing unit 46 of the controller 12.

Although the control command details of the control history information illustrated in FIG. 6 are not required, for example, in the case of a user-controlled control function, account information (the ID, the role, or the authority, etc.) of a user such as an administrator may be stored as the control command details. In the control command details of the control history information illustrated in FIG. 6, for example, in the case of a control function of linked control, the condition under which the linked control was activated ($CO_2$ linking, key linking, etc.) may be stored as the control command details.

The control history information in FIG. 6 is an example, and the information in the control function priority management table managed by the control function priority managing unit 48 of the controller 12 may be acquired, and the record with the highest priority level and a non-null value may be selected and stored.

The equipment device state information managing unit 30 manages the state information of the equipment device 14 received from the controller 12. The control function unit 32 is an example of a control function provided in the monitoring apparatus 10, and transmits a control command specifying the priority level set in the control function of itself to the controller 12.

By using the control history information managed by the control history information managing unit 28 and the state information of the equipment device 14 managed by the equipment device state information managing unit 30, the display control unit 24 creates and displays a summary screen and a trend screen used by the user for monitoring the equipment device 14. The operation receiving unit 26 receives an operation from the user with respect to the summary screen and the trend screen, for example. The functional block diagram of FIG. 3 is an example, and at least a part of the controller 12 may be provided in the monitoring apparatus 10. For example, a function executed by the equipment device control unit 54 of the controller 12 may be provided in the monitoring apparatus 10, that is, the function for controlling the equipment device 14 that is the monitoring target according to a control command having the highest priority level and a non-null value, based on the control function priority management table managed by the control function priority managing unit 48.

<Processing>

Figure 7:
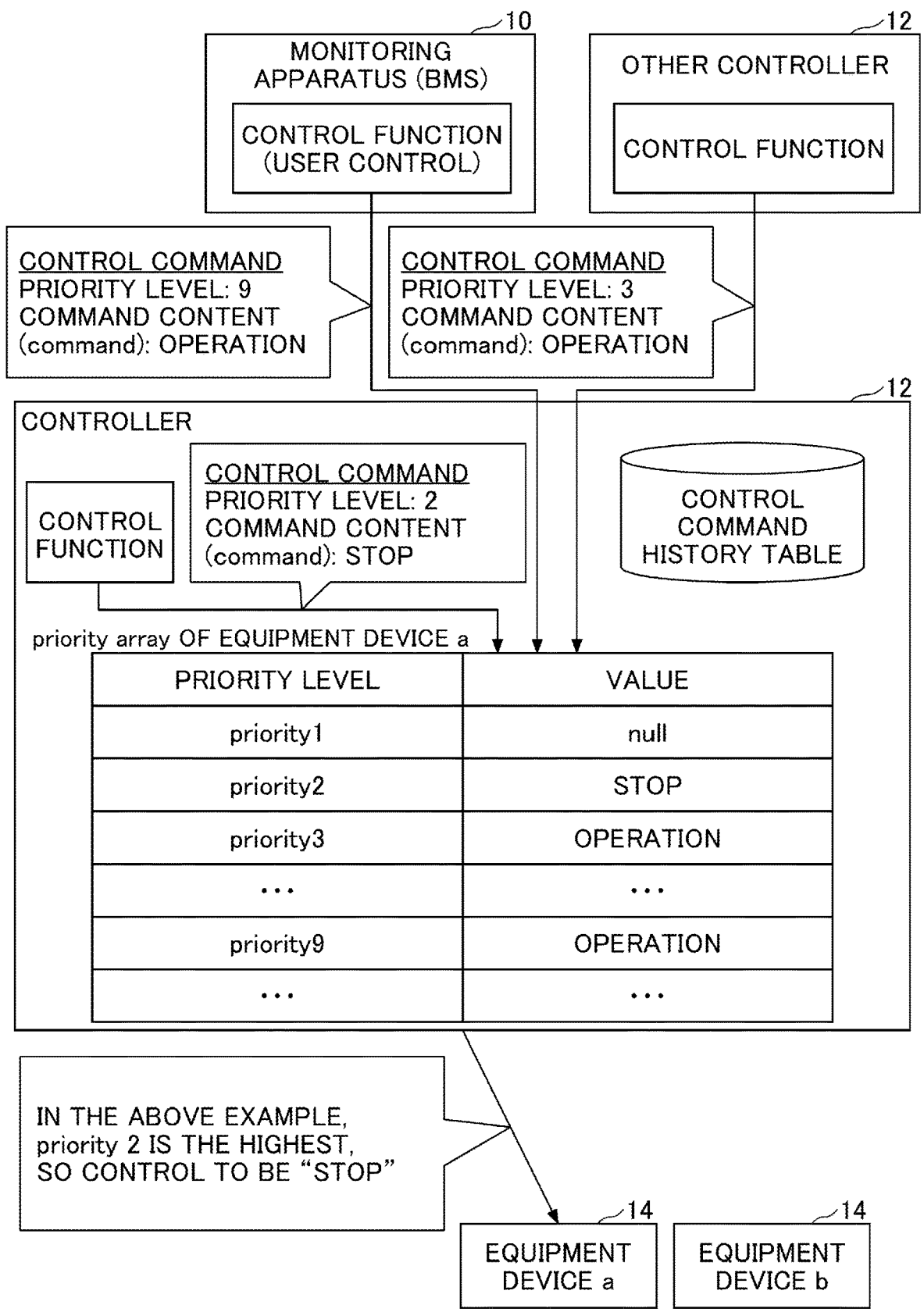
FIG. 7 illustrates an explanation of an example of a processing outline of a controller according to the present embodiment.

For example, the control function priority managing unit 48 of the controller 12 updates the value of the control function priority management table in FIG. 4 by the procedure illustrated in FIG. 7 to control the equipment device 14 that is the monitoring target. FIG. 7 is a diagram of an example of the processing outline of the controller according to the present embodiment.

The controller 12 manages a control function priority management table for each equipment device 14 that is the monitoring target. The controller 12 may manage the control function priority management table for each group of equipment devices 14 that are the monitoring targets. The controller 12 receives control commands from the monitoring apparatus 10 or another controller 12, or from a control function implemented in the controller 12.

Based on a received control command, the controller 12 updates the values in the control function priority management table. For example, in FIG. 7, the controller 12 receives a control command in which the priority level is "9" and the command content is "operation", from the control function according to user control of the monitoring apparatus 10. The controller 12 receives a control command in which the priority level is "3" and the command content is "operation", from the control function of the other controller 12. The controller 12 receives a control command in which the priority level is "2" and the command content is "stop" from the control function implemented in the controller 12.

The controller 12 updates the value as illustrated in FIG. 7 based on a control command from the monitoring apparatus 10 or another controller 12 or a control command received from the control function implemented in the controller 12.

Based on the control function priority management table corresponding to the equipment device 14 that is the monitoring target, the controller 12 controls the equipment device 14 that is the monitoring target according to the control command having the highest priority level and a non-null value. For example, in FIG. 7, the control command of priority level "2" is selected as the control command having the highest priority level and a non-null value.

Therefore, the controller 12 controls the equipment device 14 that is the monitoring target to stop operating according to the control command of the priority level "2". The controller 12 manages the history of control commands received from each of the control functions by, for example, the control command history table in FIG. 5.

As illustrated in FIG. 7, the controller 12 can select the control command to be used for controlling the equipment device 14 from the control commands received from the multiple control functions according to the control function priority management table corresponding to the equipment device 14 that is the monitoring target. The equipment device 14 changes the operation state according to the control from the controller 12.

Figure 8:
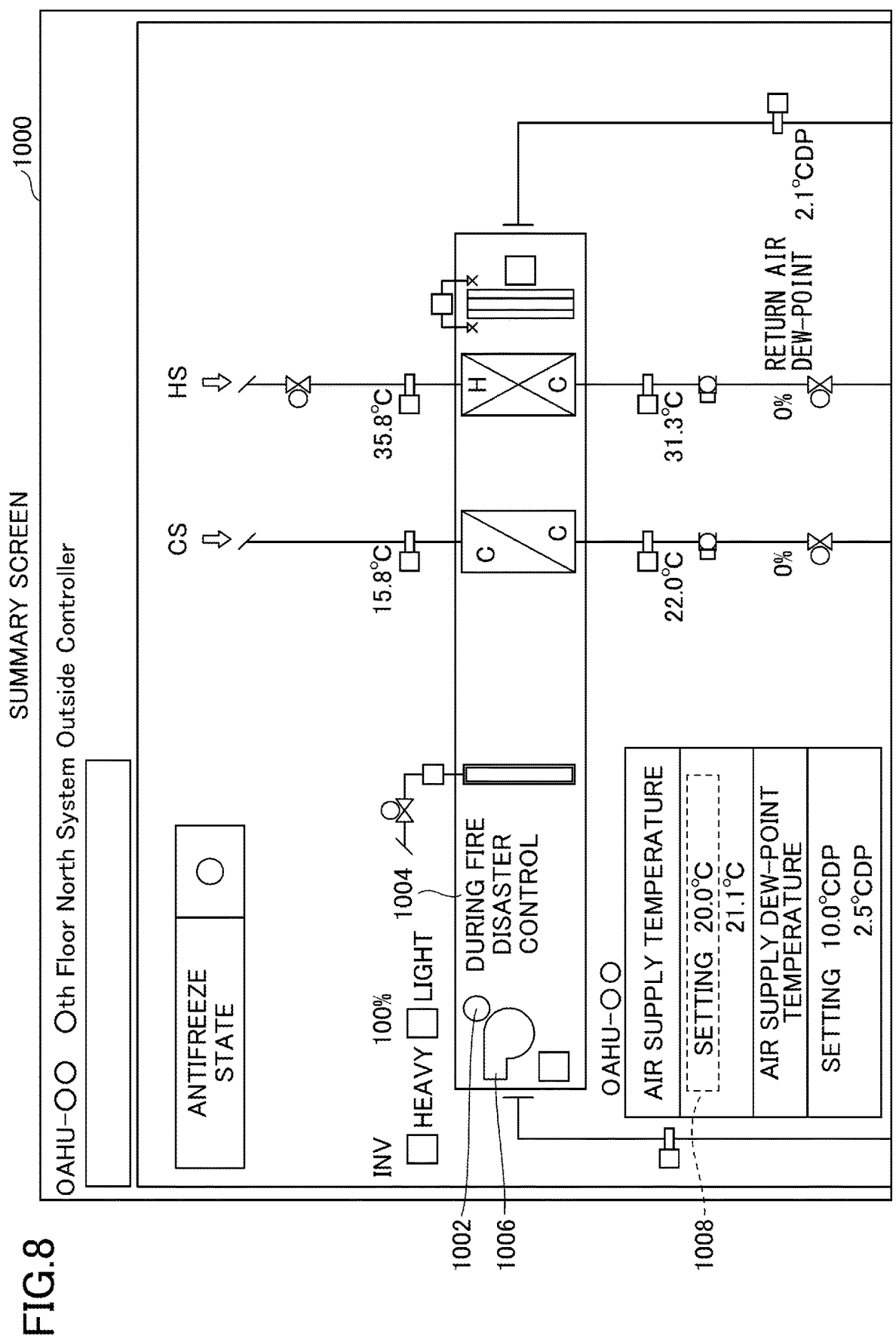
FIG. 8 illustrates an image of an example of a summary screen.

For example, the display control unit 24 of the monitoring apparatus 10 creates and displays a summary screen 1000 as illustrated in FIG. 8. FIG. 8 is an image diagram of an example of the summary screen. The summary screen 1000 according to the present embodiment is an example of a state display screen that displays the operation state of the equipment device 14 that is the monitoring target in summary.

The summary screen 1000 includes a symbol 1006 representing the equipment device 14 that is the monitoring target, a symbol 1002 representing the operation state of the equipment device 14, information 1004 about the control that changed the operation state of equipment device 14, and information 1008 about temperature settings. For example, the symbol 1002 representing the operation state of the equipment device 14 illustrated in FIG. 8 changes in color and shape so that the operation state such as stopping or operating can be visually determined. Further, the information 1004 relating to the control that changed the operation state of the equipment device 14 illustrated in FIG. 8 represents the information relating to the control such as "fire disaster control" which is the factor that changed the operation state indicated by the symbol 1002.

By confirming the information 1004 relating to the control that changed the operation state of the equipment device 14 on the summary screen 1000 of FIG. 8, the user can identify the control function that changed the operation state of the equipment device 14 to the operation state indicated by the symbol 1002.

The information 1004 relating to the control that changed the operation state of the equipment device 14 illustrated in FIG. 8 is an example, and the information may be displayed, for example, as illustrated in FIG. 9A and FIG. 9B. FIG. 9A and FIG. 9B are display examples of the information relating to the control that changed the operation state of the equipment device.

FIG. 9A is a display example of the information 1004 relating to the control that changed the operation state of the equipment device 14 in the form of text, symbol, tooltip, symbol+tooltip, or command dialog. FIG. 9B is a display example in which the priority level is added to the example of FIG. 9A. The display examples in FIGS. 9A and 9B are examples; other examples will suffice so long as the display enables the user to identify the control function that changed the operation state of the equipment device 14 to the current state.

FIGS. 10A and 10B are explanatory diagrams of one example of a trend screen. As illustrated in FIG. 10A, the user who monitors the equipment device 14 can transition from the summary screen to the trend screen to confirm the trend screen as illustrated in FIG. 10B. In the publication of Japanese Patent No. 5653227, an example of the display of the control state trend screen is illustrated in FIG. 1, which displays the control state trend indicating the transition between the operation state and the control state of the target device.

In the present embodiment, the reason why one or more equipment devices 14 are in the current operation state can be identified for each equipment device 14 on the summary screen without transitioning to the trend screen, making it easy for the user who monitors the equipment device 14 to identify the reason. Further, the number of operations of the monitoring apparatus 10 by the user who monitors the equipment device 14 can be reduced.

The summary screen illustrated in FIG. 8 is an example, and for example, the configuration illustrated in FIG. 11 may be used. FIG. 11 is an image diagram of an example of a summary screen. The summary screen in FIG. 11 is an example of an annunciator type screen. As illustrated in FIG. 11, the summary screen according to the present embodiment does not necessarily need to display the symbol 1006 of the equipment device 14 that is the monitoring target.

FIG. 11 includes, for each equipment device 14 that is the monitoring target, text information for identifying the equipment device 14, text information for indicating the operation state of the equipment device 14, text information relating to the control that changed the operation state of the equipment device 14, and the time when the operation state of the equipment device 14 changed.

Note that the display control by the monitoring apparatus 10 according to the present embodiment may have variations as illustrated in, for example, FIG. 12. FIG. 12 is a diagram for explaining variations of the display control according to the present embodiment. The display control by the monitoring apparatus 10 can be divided into the cases of, for example, constant display, display when the user operates, or display when the controller 12 controls in a different manner from the user's intention, as illustrated in FIG. 12. Further, as illustrated in FIG. 12, the authority (role) of the user operating the monitoring apparatus 10 can be divided into the cases of, for example, administrator, field service, or air conditioner user. In FIG. 12, "SAMPLE 1" to "SAMPLE 3"

are processed by a combination of dividing into the cases of display control and dividing into the cases of user authority.

Figure 13:
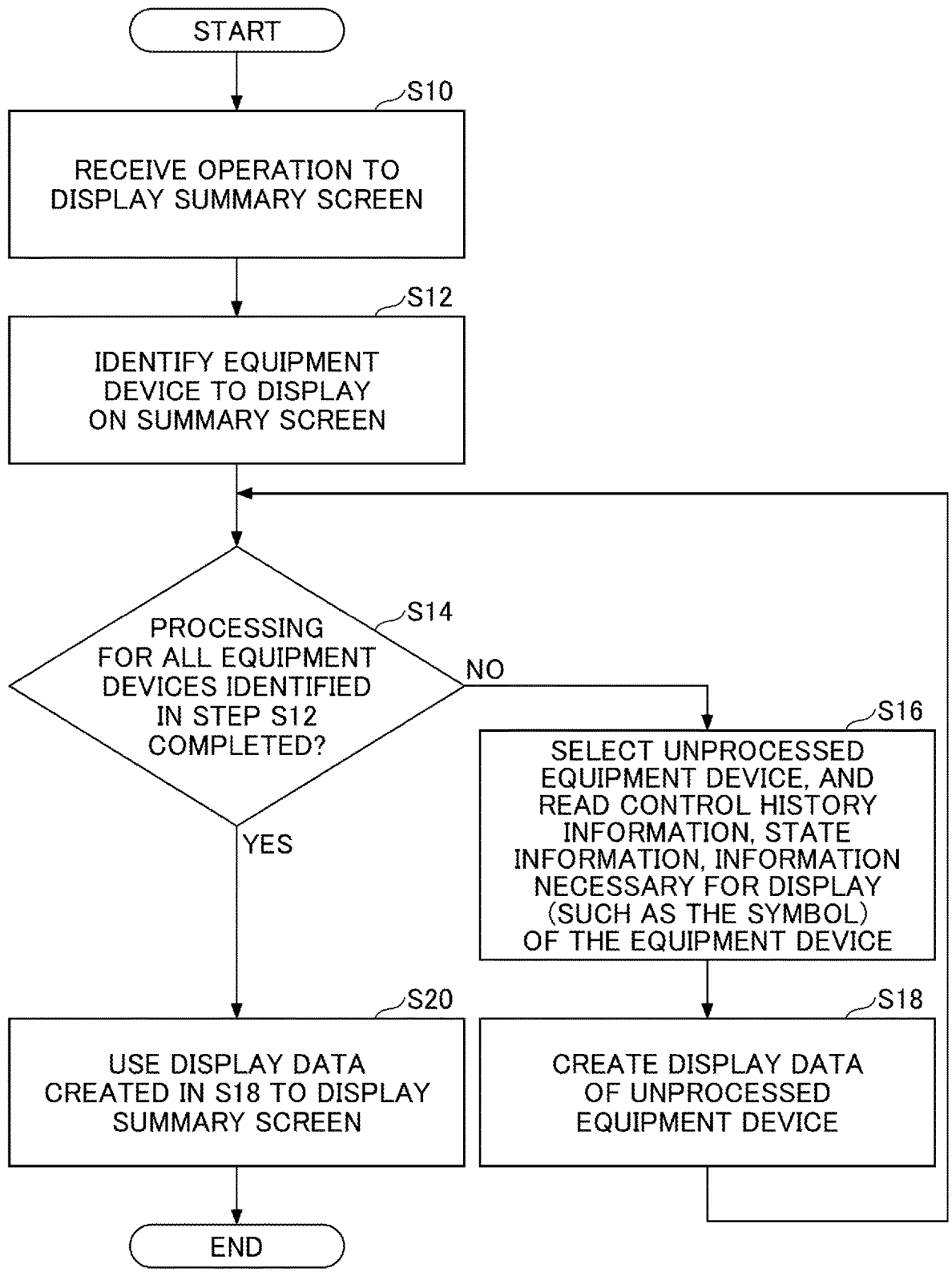
FIG. 13 is a flowchart of one example of a process by the monitoring apparatus.

"SAMPLE 2" is processed, for example, by the processing procedure illustrated in FIG. 13. FIG. 13 is a flowchart of one example of the processing by the monitoring apparatus. For example, when responding to an inquiry from the administrator user, the field service user needs to identify the command content on which the current operation state of the equipment device 14 is based on, the control function from which the command content was received, and when the control function was received.

In step S10, the monitoring apparatus 10 receives a display operation for displaying a summary screen, from the user. In step S12, the monitoring apparatus 10 identifies the equipment device 14 necessary for creating the summary screen for which a display operation has been received from the user. For example, when the monitoring apparatus 10 has received a display operation for the summary screen 1000 illustrated in FIG. 8, the monitoring apparatus 10 identifies the equipment device 14 to be displayed on the summary screen 1000 of the "OAHU-○○ ○th Floor North System Outside Controller" in FIG. 8.

In step S14, the monitoring apparatus 10 repeats the processing of steps S14 to S18 until the processing for all equipment devices 14 identified in step S12 is completed. In step S16, the monitoring apparatus 10 selects an unprocessed equipment device 14 for which display data has not been created, and reads the control history information, state information, information necessary for display (such as the symbol of the equipment device 14), etc., of the equipment device 14.

In step S18, the monitoring apparatus 10 uses the information read in step S16 to create display data of the equipment device 14 that is the processing target, including, for example, the symbol 1006 representing the equipment device 14, the symbol 1002 representing the operation state of the equipment device 14, and the information 1004 relating to the control that changed the operation state of the equipment device 14, as illustrated in FIG. 8.

For example, in the processing of step S18, the monitoring apparatus 10 identifies the highest priority level storing a non-null value from the control history information table as illustrated in FIG. 6. Then, the monitoring apparatus 10 creates display data of the equipment device 14 by identifying the control function that reported the control command of the identified priority level, the control command details, the value that is the command content, the time when the control command was received, etc.

Then, when the monitoring apparatus 10 ends the processing for all the equipment devices 14 identified in step S12, the monitoring apparatus 10 performs the processing of step S20. In step S20, the monitoring apparatus 10 uses the display data created in step S18 to display, for example, the summary screen 1000 as illustrated in FIG. 8. The summary screen 1000 constantly displays the symbol 1006 representing the equipment device 14, the symbol 1002 representing the operation state of the equipment device 14, and the information 1004 relating to the control that changed the operation state of the equipment device 14.

Figure 14:
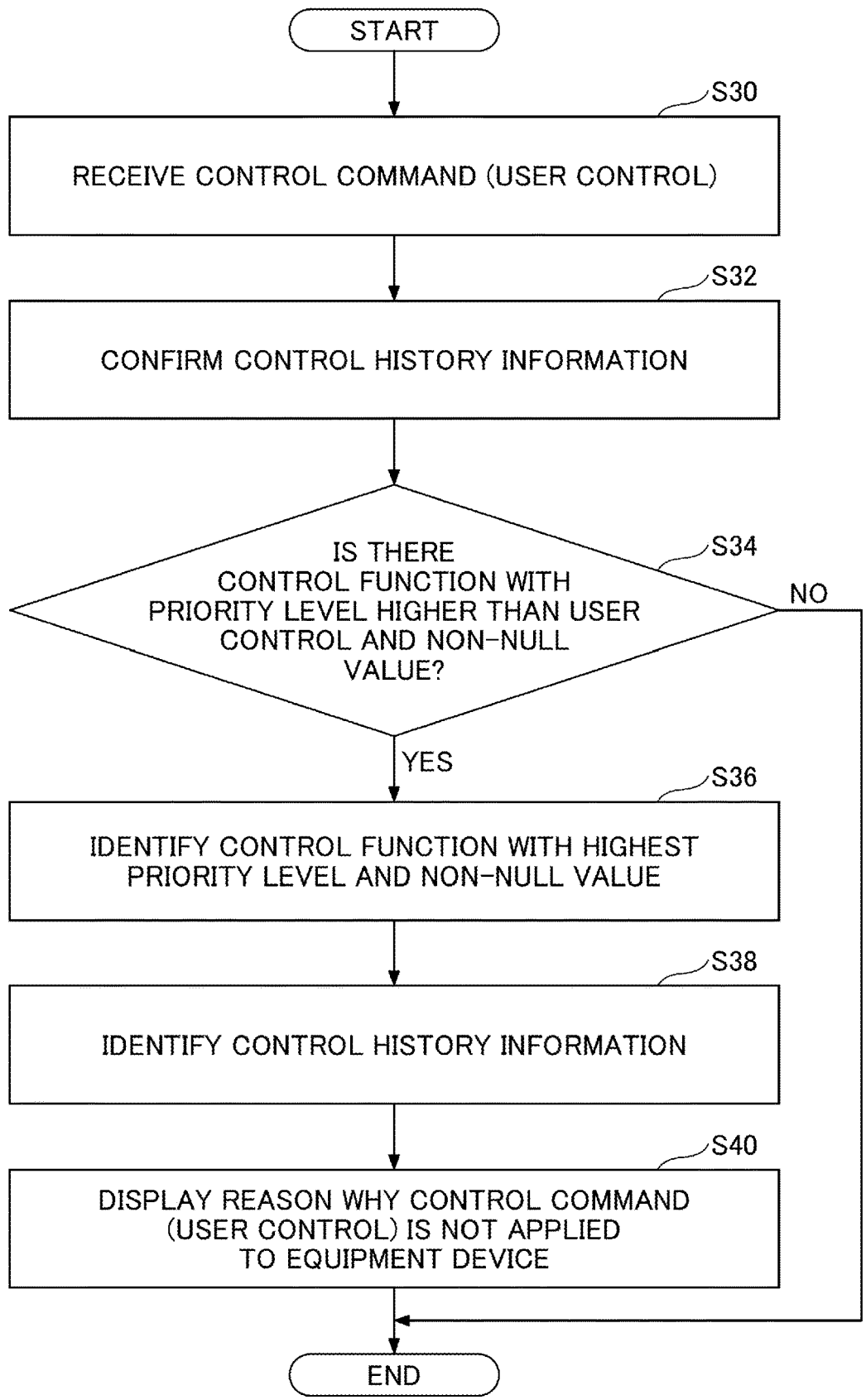
FIG. 14 is a flowchart of one example of a process by the monitoring apparatus.

The processing of "SAMPLE 1" is performed, for example, by the processing procedure illustrated in FIG. 14. FIG. 14 is a flowchart of one example of the processing by the monitoring apparatus. The administrator user may use the monitoring apparatus 10 to perform an operation to change the operation state of the equipment device 14. For example, when the controller 12 controls the equipment device 14 with a control function that has a higher priority level than the control function according to user control, the command content given by the control function according to user control is not applied in the control of the equipment device 14. The administrator user needs to identify the reason why the command content given by the control function according to user control performed by the user himself/herself is not applied in the control of the equipment device 14 and take an appropriate action. Therefore, the monitoring apparatus 10 performs the processing illustrated in FIG. 14 to easily identify the reason why the command content given by the control function according to user control performed by the administrator user is not applied in the control of the equipment device 14.

In step S30, the monitoring apparatus 10 receives a control command by a control function according to user control from the administrator user. The monitoring apparatus 10 sends the control command received from the administrator user to the controller 12.

In step S32, the monitoring apparatus 10 confirms control history information of the equipment device 14 corresponding to the received control command. In step S34, the monitoring apparatus 10 uses a control history information table as illustrated in FIG. 6 to determine whether there is a control function storing a non-null value with a higher priority level than the user control.

If there is no control function storing a non-null value with a higher priority level than the user control, the monitoring apparatus 10 ends the processing in FIG. 14. If there is a control function storing a non-null value with a higher priority level than the user control, the monitoring apparatus 10 performs the processing in steps S36 to S40.

In step S36, the monitoring apparatus 10 identifies the control function with the highest priority level and a non-null value. In step S38, the monitoring apparatus 10 identifies the control function that reported the control command of the identified priority level, the control command details, the value that is the command content, and information such as the time when the control command was received.

Then, in step S40, the monitoring apparatus 10 uses the information identified in step S38 to display the summary screen 1000 as illustrated in, for example, FIG. 8, to indicate the reason why the control command by the control function according to user control was not applied in the control of the equipment device 14. The contents displayed in the summary screen 1000 may be changed according to the user's authority.

According to the processing illustrated in FIG. 14, the information 1004 relating to the control that changed the operation state of the equipment device 14 is displayed in the summary screen 1000, and, therefore, it is easy to identify the reason why the command content of the control function according to user control performed by the user himself/ herself is not applied in the control of the equipment device 14, and an appropriate measure can be taken quickly.

Figure 15:
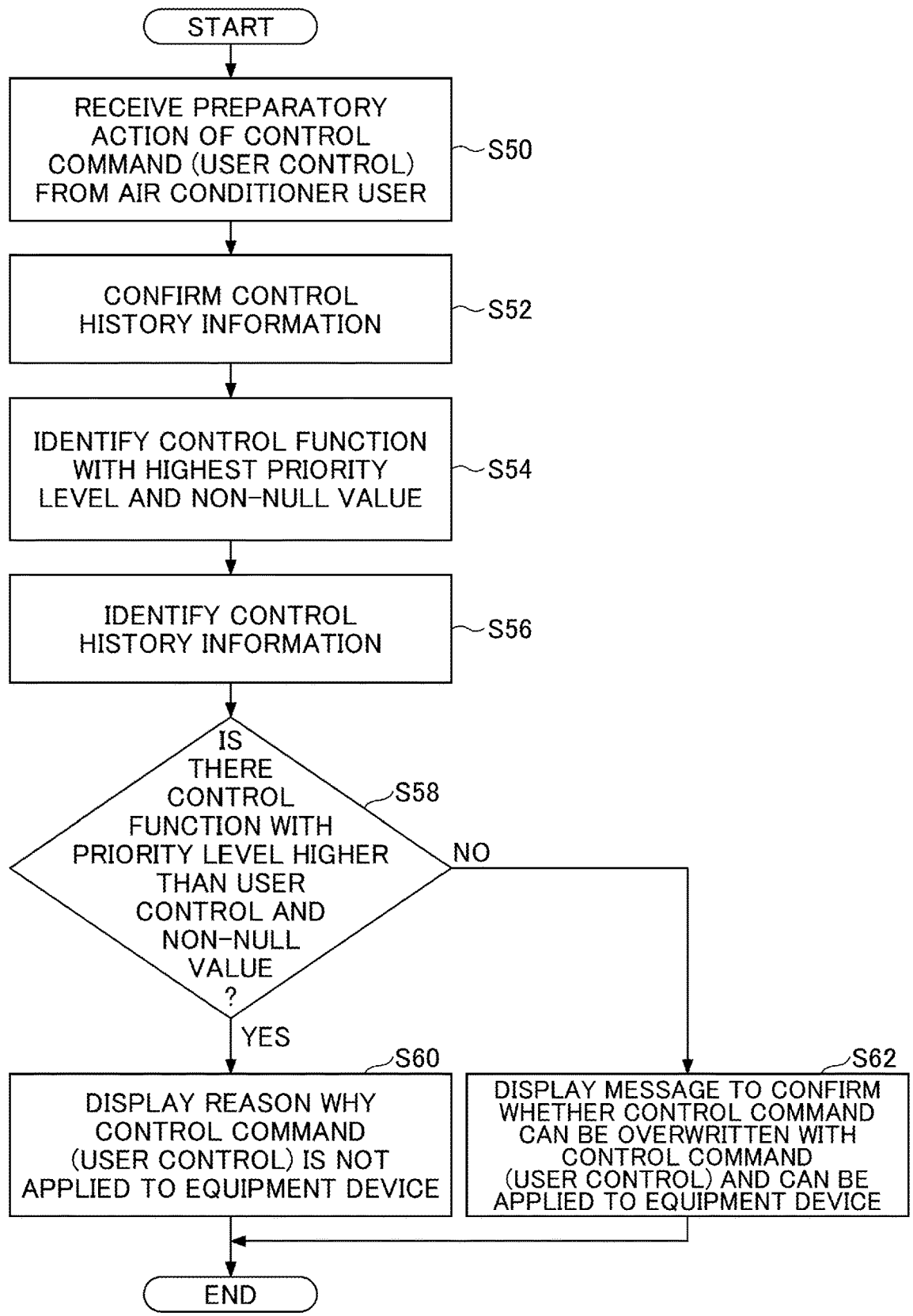
FIG. 15 is a flowchart of one example of a process by the monitoring apparatus.

The processing of "SAMPLE 3" is performed, for example, by the processing procedure illustrated in FIG. 15. FIG. 15 is a flowchart of one example of the processing by the monitoring apparatus. The air conditioner user may use the monitoring apparatus 10 to perform an operation to change the operation state of the equipment device 14. For example, if the controller 12 controls the equipment device 14 with a control function that has a higher priority level than the control function according to user control, the command content given by the control function according to user control is not applied in the control of the equipment device 14. The air conditioner user may become confused when the command content given by the control function according to user control performed by the user himself/herself is not applied in the control of equipment device 14. Therefore, the monitoring apparatus 10 performs the processing illustrated in FIG. 15 to inform the air conditioner user the reason why the command content of the control function according to user control performed by the air conditioner user is not applied in the control of equipment device 14.

In step S50, the monitoring apparatus 10 receives, from the air conditioner user, a preparatory action to issue a control command by the control function according to user control. The preparatory action includes an operation to open the operation panel of the control function according to user control and an operation to open a right click menu for the control function according to user control.

In step S52, the monitoring apparatus 10 confirms the control history information of the equipment device 14 for which the preparatory action has been received. In step S54, the monitoring apparatus 10 uses the control history information table as illustrated in FIG. 6 to identify the control function storing the highest priority level and a non-null value. In step S56, the monitoring apparatus 10 identifies the control function that reported the control command of the identified priority level, the control command details, the value that is the command content, and information such as the time when the control command was received.

In step S58, the monitoring apparatus 10 determines whether the priority level of the control function identified in step S54 is higher than the priority level of the user control. If the priority level of the control function identified in step S54 is higher than the priority level of the user control, the monitoring apparatus 10 performs the processing in step S60. In step S60, the monitoring apparatus 10 uses the information identified in step S56 to display the summary screen 1000 as illustrated in, for example, FIG. 8 to indicate the reason why the control command by the control function according to user control is not applied in the control of the equipment device 14. The monitoring apparatus 10 displays, for example, the control function that reported the control command of the identified priority level, the control command details, the value that is the command content, information such as the time when the control command was received, and displays the fact that the control command given by the control function according to user control is not applied, because the control command from the control function of higher priority level is prioritized.

If the priority level of the control function identified in step S54 is not higher than the priority level of the user control, the monitoring apparatus 10 performs the processing in step S62. In step S62, the monitoring apparatus 10 displays, for example, the control function that reported the control command of the identified priority level, the control command details, the value that is the command content, and information such as the time when the control command was received, and displays a message to confirm whether the control command from the control function can be overwritten with the control command given by the control function according to user control and applied in the control of the equipment device 14.

Note that the processing in FIG. 15 starts by receiving, from the air conditioner user, a preparatory action for issuing a control command given by the control function according to user control, but the processing in FIG. 15 can be performed before receiving the preparatory action, for example, and a button for receiving the preparatory action can be grayed out and disabled. The monitoring apparatus 10 can perform the processing in FIG. 15 regardless of the processing for receiving the preparatory action, for example, and may not receive the control function according to user control.

According to the processing illustrated in FIG. 15, it is possible to know in advance the reason why the command content given by the control function according to user control by the user himself/herself is not applied in the control of the equipment device 14, thereby avoiding confusion caused by the fact that the command content given by the control function according to user control is not applied in the control of the equipment device 14.

According to the monitoring system according to the present embodiment, the user can identify, on the summary screen 1000, the control that is the factor that changed the operation state of the equipment device 14.

Although the present invention has been described above based on the examples, the present invention is not limited to the examples above, and various modifications are possible within the scope of the claims. The present application is based upon and claims priority to Japanese Patent Application No. 2020-218534 filed on Dec. 28, 2020, the entire contents of which are incorporated herein by reference.

REFERENCE SIGNS LIST

10 monitoring apparatus
12 controller
14 equipment device
18 network
20 control history information receiving unit
22 equipment device state information receiving unit
24 display control unit
26 operation receiving unit
28 control history information managing unit
30 equipment device state information managing unit
32 control function unit
40 control history information transmitting unit
42 equipment device state information transmitting unit
44 equipment device state information acquiring unit
46 control command history managing unit
48 control function priority managing unit
50 control function unit
52 control command receiving unit
54 equipment device control unit
1000 summary screen
1002 symbol representing the operation state of equipment device
1004 information relating to control that changed the operation state of equipment device
1006 symbol of equipment device that is monitoring target

The invention claimed is:

1. A monitoring apparatus of a plurality of equipment devices that displays, on a state display screen, an operation state of each of the plurality of equipment devices in summary, the monitoring apparatus comprising:
   a processor configured to display, on the state display screen, information indicating each of the plurality of equipment devices and information relating to control that changed the operation state of the equipment device, in association with each other, wherein
   the information relating to the control that changed the operation state of the equipment device includes information indicating a control function that reported a control command and changed the operation state of the equipment device, said information relating to control that changed the operation state of the equipment device including a reason why a command content given by a control function according to user control performed by a user is not applied in a control of the equipment device and further including the operation state of the equipment device and a diagram of a structure of the equipment device that is subject to the control, said operation state of the equipment device, said information relating to the control that changed the operation state of the equipment device and said diagram of the structure of the equipment device being simultaneously displayed in the summary on the state display screen.

2. The monitoring apparatus according to claim 1, wherein the information relating to the control that changed the operation state of the equipment device includes a control function that changed the operation state of the equipment device and information indicating a command content.

3. The monitoring apparatus according to claim 2, wherein the information relating to the control that changed the operation state of the equipment device further includes information indicating a time when the control function changed the operation state of the equipment device.

4. The monitoring apparatus according to claim 2, wherein the processor is further configured to manage, as control history information of each of the plurality of equipment devices, the control function that reported a control command for changing the operation state of the equipment device, the command content included in the control command, and information indicating a priority level of the control function, and
the processor displays, on the state display screen by using the control history information, the control function that most recently changed the operation state of the equipment device and information indicating the command content, in association with the information indicating each of the plurality of equipment devices.

5. The monitoring apparatus according to claim 2, wherein
the control function includes a control function for changing the operation state of the equipment device by a user operation, and
the information relating to the control that changed the operation state of the equipment device further includes information indicating a user that has executed the user operation.

6. The monitoring apparatus according claim 2, wherein the control function includes a control function for changing the operation state of the equipment device by linking with another function, and
the information relating to the control that changed the operation state of the equipment device further includes information indicating a condition under which the linking with the another function was activated.

7. The monitoring apparatus according to claim 1, wherein the control that changed the operation state of the equipment device includes a fire disaster control, and the control function according to user control performed by the user includes a user-controlled control function.

8. The monitoring apparatus according to claim 1, wherein a numerical value indicating a priority level of the control that changed the operation state of the equipment device is simultaneously displayed in the summary on the state display screen together with the operation state of the equipment device, the information relating to the control that changed the operation state of the equipment device and the diagram of the structure of the equipment device.

9. A display method performed in a monitoring apparatus of a plurality of equipment devices that displays, on a state display screen, an operation state of each of the plurality of equipment devices in summary, the display method comprising:
a step of receiving, from a first control function, a control command for changing the operation state of an equipment device; and
a step of displaying, on the state display screen, information relating to control by a second control function, in response to detecting that a priority level of the second control function that reported a control command and changed the operation state of the equipment device is higher than a priority level of the first control function, wherein
the information relating to the control by the second control function includes information indicating the second control function and a reason why a command content given by a control function according to user control performed by a user is not applied in a control of the equipment device and further includes the operation state of the equipment device and a diagram of a structure of the equipment device that is subject to the control, said operation state of the equipment device, said information relating to the control by the second control function and said diagram of the structure of the equipment device being simultaneously displayed in the summary on the state display screen.

10. A display method performed in a monitoring apparatus of a plurality of equipment devices that displays, on a state display screen, an operation state of each of the plurality of equipment devices in summary, the display method comprising:
a step of acquiring, for each of the equipment devices, information relating to control that changed the operation state of each of the plurality of equipment devices; and
a step of displaying, on the state display screen, information indicating each of the plurality of equipment devices and the information relating to the control that changed the operation state of the equipment device, in association with each other, wherein
the information relating to the control that changed the operation state of the equipment device includes:
information indicating a control function that reported a control command and changed the operation state of the equipment device,
a reason why a command content given by a control function according to user control performed by a user is not applied in a control of the equipment device, and
the operation state of the equipment device and a diagram of a structure of the equipment device that is subject to the control, said operation state of the equipment device, said information relating to the control that changed the operation state of the equipment device and said diagram of the structure of the equipment device being simultaneously displayed in the summary on the state display screen.

11. A display method performed in a monitoring apparatus of a plurality of equipment devices that displays, on a state display screen, an operation state of each of the plurality of equipment devices in summary, the display method comprising:
a step of receiving a user operation with respect to a first control function for changing the operation state of the equipment device; and a step of displaying, on the state display screen, information relating to control by a second control function to be overwritten by information relating to control by the first control function, in response to detecting that a priority level of the second control function that reported a control command and changed the operation state of the equipment device is lower than a priority level of the first control function, wherein the information relating to the control by the second control function includes:

information indicating the second control function, and a reason why a command content given by a control function according to user control performed by a user is not applied in a control of the equipment device, and the operation state of the equipment device and a diagram of a structure of the equipment device that is subject to the control, said operation state of the equipment device, said information relating to the control by the second control function and said diagram of the structure of the equipment device being simultaneously displayed in the summary on the state display screen.

12. A non-transitory recording medium storing a plurality of instructions which, when executed by one or more processors, causes a monitoring apparatus of a plurality of equipment devices that displays, on a state display screen, an operation state of each of the plurality of equipment devices in summary, to execute:

a step of receiving, from a first control function, a control command for changing the operation state of an equipment device; and a step of displaying, on the state display screen, information relating to control by a second control function, in response to detecting that a priority level of the second control function that reported a control command and changed the operation state of the equipment device is higher than a priority level of the first control function, wherein the information relating to the control by the second control function includes:

information indicating the second control function, and a reason why a command content given by a control function according to user control performed by a user is not applied in a control of the equipment device, and the operation state of the equipment device and a diagram of a structure of the equipment device that is subject to the control, said operation state of the equipment device, said information relating to the control by the second control function and said diagram of the structure of the equipment device being simultaneously displayed in the summary on the state display screen.

13. A non-transitory recording medium storing a plurality of instructions which, when executed by one or more processors, causes a monitoring apparatus of a plurality of equipment devices that displays, on a state display screen, an operation state of each of the plurality of equipment devices in summary, to execute:

a step of acquiring, for each of the equipment devices, information relating to control that changed the operation state of each of the plurality of equipment devices; and a step of displaying, on the state display screen, information indicating each of the plurality of equipment devices and the information relating to the control that changed the operation state of the equipment device, in association with each other, wherein the information relating to the control that changed the operation state of the equipment device includes:

information indicating a control function that reported a control command and changed the operation state of the equipment device, a reason why a command content given by a control function according to user control performed by a user is not applied in a control of the equipment device, and the operation state of the equipment device and a diagram of a structure of the equipment device that is subject to the control, said operation state of the equipment device, said information relating to the control that changed the operation state of the equipment device and said diagram of the structure of the equipment device being simultaneously displayed in the summary on the state display screen.

14. A non-transitory recording medium storing a plurality of instructions which, when executed by one or more processors, causes a monitoring apparatus of a plurality of equipment devices that displays, on a state display screen, an operation state of each of the plurality of equipment devices in summary, to execute:

a step of receiving a user operation with respect to a first control function for changing the operation state of the equipment device; and a step of displaying, on the state display screen, information relating to control by a second control function to be overwritten by information relating to control by the first control function, in response to detecting that a priority level of the second control function that reported a control command and changed the operation state of the equipment device is lower than a priority level of the first control function, wherein the information relating to the control by the second control function includes:

information indicating the second control function, and a reason why a command content given by a control function according to user control performed by a user is not applied in a control of the equipment device, and the operation state of the equipment device and a diagram of a structure of the equipment device that is subject to the control, said operation state of the equipment device, said information relating to the control by the second control function and said diagram of the structure of the equipment device being simultaneously displayed in the summary on the state display screen.

15. A monitoring system of a plurality of equipment devices that displays, on a state display screen, an operation state of each of the plurality of equipment devices in summary, the monitoring system comprising:

a processor configured to:

control an operation of one or more of the equipment devices according to a control command from a plurality of control functions associated with priority levels;

acquire, from the control unit, information relating to control that changed the operation state of the equipment device; and display, on the state display screen, information indicating each of the plurality of equipment devices and the information relating to the control that changed the operation state of the equipment device, in association with each other, wherein the information relating to the control that changed the operation state of the equipment device includes:

information indicating a control function that reported a control command and changed the operation state of the equipment device, a reason why a command content given by a control function according to user control performed by a user is not applied in a control of the equipment device, and the operation state of the equipment device and a diagram of a structure of the equipment device that is subject to the control, said operation state of the equipment device, said information relating to the control that changed the operation state of the equipment device and said diagram of the structure of the equipment device being simultaneously displayed in the summary on the state display screen.

* * * * *